United States Patent [19]

Garcia

[11] 4,429,765

[45] Feb. 7, 1984

[54] COLLAPSIBLE SAWHORSE

[75] Inventor: Gilbert C. Garcia, Corpus Christi, Tex.

[73] Assignee: Homer Ramos, Corpus Christi, Tex.; a part interest

[21] Appl. No.: 372,153

[22] Filed: Apr. 27, 1982

Related U.S. Application Data

[63] Continuation-in-part of Ser. No. 216,019, Dec. 12, 1980.

[51] Int. Cl.[3] .................... B27B 21/00; F16M 11/00; A47B 37/00

[52] U.S. Cl. .................................. 182/153; 182/181; 182/225

[58] Field of Search ............... 182/153, 181, 182, 183, 182/184, 185, 186, 224, 225, 226; 248/166, 168

[56] References Cited

U.S. PATENT DOCUMENTS

| | | | |
|---|---|---|---|
| 249,095 | 11/1881 | Reyburn et al. | 182/153 |
| 1,685,372 | 9/1928 | Davis | 182/184 |
| 1,880,909 | 10/1932 | Dunlap | 182/181 |
| 2,817,486 | 12/1957 | Skreberg | 248/166 |
| 2,829,927 | 4/1958 | Sword | 182/181 |
| 3,696,887 | 10/1972 | Brzykcy | 182/186 |
| 3,734,235 | 5/1973 | Lanier | 182/153 |
| 4,071,113 | 1/1978 | Pelser | 182/181 |
| 4,085,762 | 4/1978 | O'Brien | 182/153 |
| 4,245,718 | 1/1981 | Poston | 182/153 |

*Primary Examiner*—R. P. Machado
*Attorney, Agent, or Firm*—G. Turner Moller

[57] ABSTRACT

A collapsible sawhorse is provided in which the legs are pivotally mounted relative to each other for movement between a conventional load supporting sawhorse position and a collapsed position. The collapsible sawhorse comprises a wide work supporting beam coextensive with the length and width of the device. A pair of rope lengths are provided to limit pivotal movement of the sawhorse legs. A brace selectively spans the legs to prevent inadvertent movement of the legs toward each other.

9 Claims, 6 Drawing Figures

COLLAPSIBLE SAWHORSE

This application is a continuation-in-part of application Ser. No. 06/216,019 filed Dec. 12, 1980.

This invention relates to sawhorses and more particularly to sawhorses which are collapsible in nature.

Sawhorses are commonly employed by carpenters, painters, drywall installers and other workers for a wide variety of reasons. The conventional sawhorse is a rigid affair which is sturdy and well-adapted for work supporting uses. One of the drawbacks of conventional sawhorses is that they are awkward to store and transport since they take up so much room.

In response to this disadvantage of conventional sawhorses, there have been proposals for knock-down sawhorses which may be disassembled for transportation and storage as exemplified in U.S. Pat. No. 2,829,927 and 4,071,113. Similarly, collapsible sawhorses have evolved in which the supporting legs may be pivoted from the diverging load supporting position to a generally parallel storage position as exemplified in U.S. Pat. Nos. 249,095, 3,696,887 and 3,734,235. It is to this latter development that this invention most nearly relates.

Another disclosure of interest is found in U.S. Pat. No. 1,685,372.

One of the disadvantages of the prior art collapsible sawhorse is that they do not provide a wide load supporting beam on the top of the sawhorse. It is, of course, advantageous to provide a suitable beam for supporting work pieces of various size and shape.

Another disadvantage of prior art collapsible sawhorses is that they are inherently capable of carrying less loads than a conventional, non-collapsible sawhorse.

In summary, this invention comprises an elongate beam of generally pentagonal cross-section having an upper planar surface corresponding to the base of the pentagon as a load supporting surface. One pair of legs is rigidly affixed to the underside of the beam and extends generally perpendicularly to one of the converging bottom faces of the beam. A second pair of legs are individually pivotally connected to the first legs with the pivot connection residing adjacent the convergence of the bottom faces. Means are provided to limit pivotal movement of the second legs relative to the first legs in a spreading direction and means are provided for selectively preventing pivotal movement of the legs toward each other.

It is an object of this invention to provide an improved collapsible sawhorse.

Another object of this invention is to provide an improved collapsible sawhorse having a wide work-supporting beam integrated into the sawhorse.

A further object of this invention is to provide an improved collapsible sawhorse having a substantial load carrying capacity.

Other objects and advantages of this invention will become more fully apparent as this description proceeds, with reference being made to the accompanying drawing and appended claims.

IN THE DRAWINGS

Figure 2:
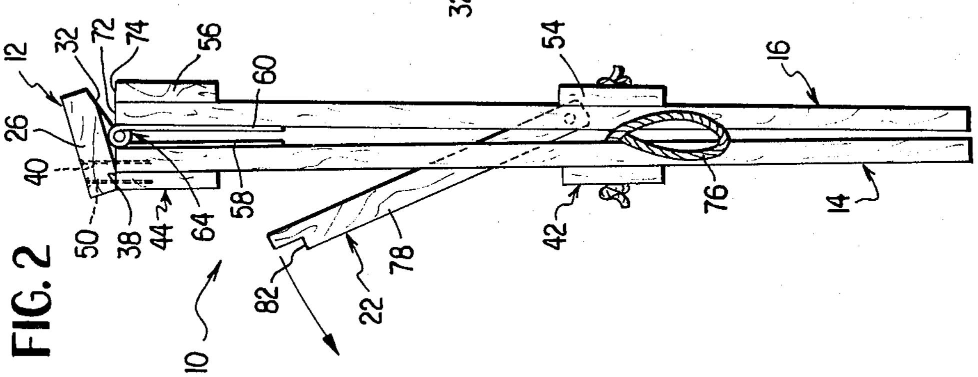
FIG. 2 is an end elevational view of the sawhorse of FIG. 1 illustrating the sawhorse in its collapsed or storage position.
Figure 1:
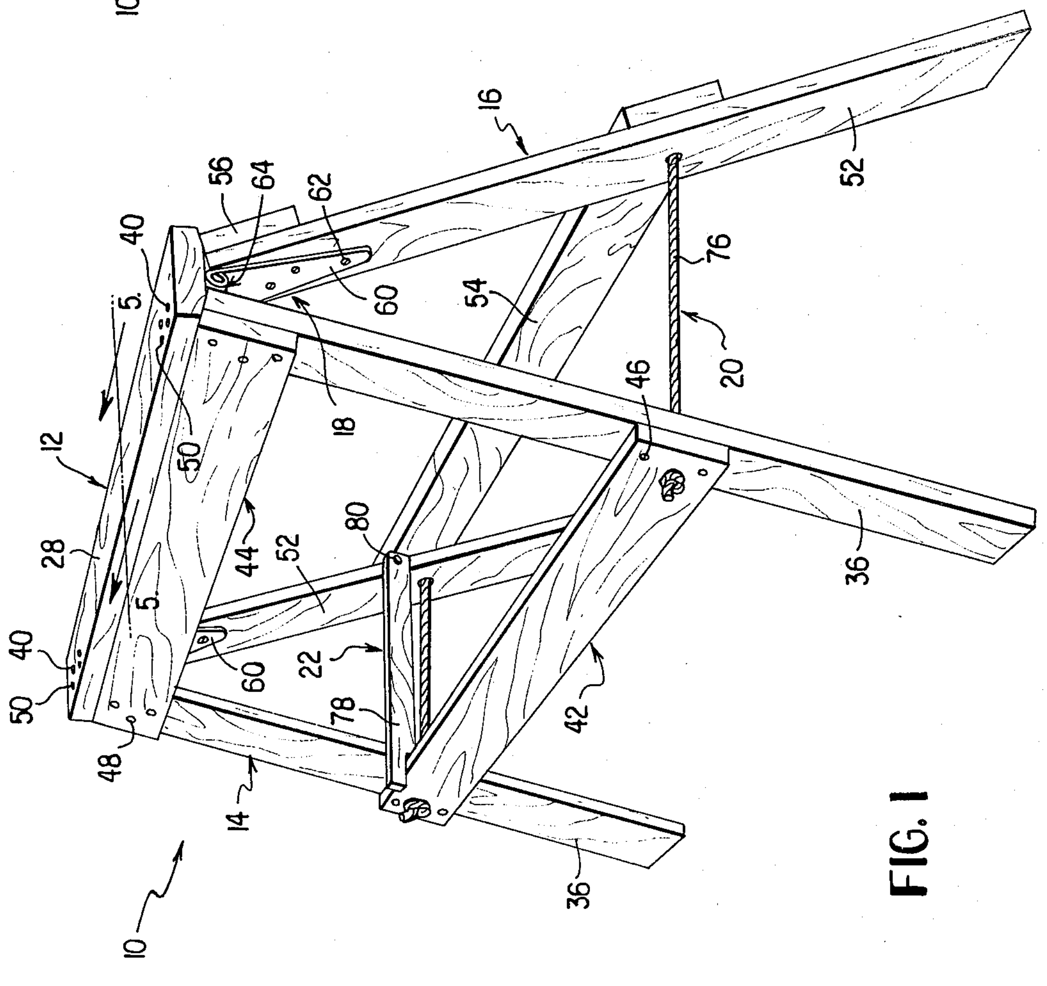
FIG. 1 is an isometric view of a collapsible sawhorse in accordance with the principles of this invention, illustrating the sawhorse in its load-supporting configuration.

Referring to FIGS. 1 and 2, there is illustrated a collapsible sawhorse 10 of this invention comprising, as major components, a load-supporting beam 12, first legs 14, second legs 16, means 18 pivoting the legs 14, 16 relative to each other, means 20 limiting pivotal movement of the legs 14, 16 in a spreading direction and means 22 for selectively preventing movement of the legs 14, 16 toward each other.

The beam 12 comprises an elongate member 26 having a long or length dimension substantially coextensive with the length of the sawhorse 10, a horizontal width dimension and a vertical thickness dimension substantially less than the width dimension. The member 26 is of generally pentagonal cross-section as shown best in FIGS. 3 and 5 providing a planar upper surface 28 corresponding to the base of the pentagon, a pair of parallel generally vertical sides 30 corresponding to the sides of the pentagon, and a pair of downwardly extending converging bottom faces 32 which, in the embodiment of FIGS. 1–5, merge to form the apex 34 of the pentagon.

The first legs 14 comprise a pair of generally straight parallel spaced members 36 having a long or length dimension and an end 38 generally perpendicular to the long dimension. The end 38 abuts one of the bottom faces 32 of the beam 12 and is rigidly secured thereto in any suitable fashion, as by the use of conventional frictional fasteners 40 such as nails, screws of the like. The first legs 14 are secured together by a pair of braces 42, 44. The braces 42 are connected to the members 36 by suitable fasteners 46 at a location intermediate the ends thereof. Preferably, the braces 42 are located slightly closer to the bottom end of the members 36 than to the upper ends 38. The braces 44 abut the members 36 adjacent the upper end 38 thereof and also abut the bottom face 32 of the beam 12. The brace 44 is secured to the members 36 by suitable fasteners 48 while additional fasteners 50 connect the beam 12 and brace 44.

The second legs 16 each comprise a member 52 which is conveniently of the same size and shape as the members 36. A pair of braces 54, 56, preferably substantially identical to the braces 42, 44, unitize the second legs 16.

The pivoting means 18 comprises hinges mounting the legs 14, 16 for movement toward and away from each other. The hinges 18 each comprise a first arm 58 secured to the first legs 14 in any suitable fashion and the second arm 60 secured to the second legs 52 in any suitable fashion, as by the use of screws 62 or the like. The first and second arms 58, 60 join in a hinge or pivot connection 64 comprised of one or more knuckles 66 connected to the first hinge arm 58 and a like number of knuckles 68 connected to the second hinge arm 60. The knuckles 66, 68 interdigitate as shown as in FIG. 4 and provide a central passage receiving a hinge pin 70 connecting the knuckles 66, 68 together thereby connecting the first and second legs 14, 16.

Figure 3:
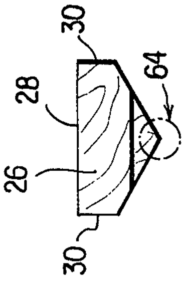
FIG. 3 is an enlarged view of the end of the load-supporting beam of the sawhorse of FIGS. 1 and 2.
Figure 4:
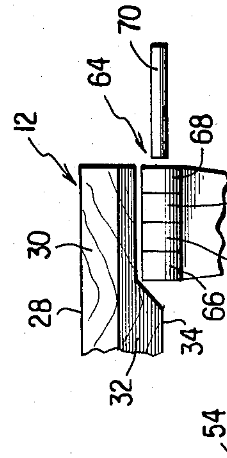
FIG. 4 is a side elevational view of the end of the load-supporting beam of the sawhorse of FIGS. 1 and 2.
Figure 5:
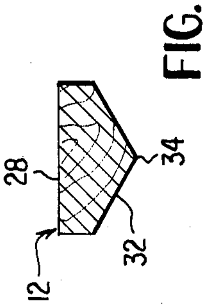
FIG. 5 is a longitudinal cross-sectional view of the sawhorse of FIGS. 1 and 2 taken substantially along line 5—5 of FIG. 1 as viewed in the direction indicated by the arrows.

It will be evident from FIGS. 2, 3 and 4 that the hinge connection 64 resides in a location where an extension of the bottom faces 32 intersect the hinge connection 64. The end of the beam 12, adjacent the hinges 18, is conveniently recessed in a wooden sawhorse, as illustrated, merely by chiselling out a portion of the wooden material adjacent the apex 34, as suggested in FIG. 4. This recessing of the hinge connection 64 is highly advantageous since it allows the upper ends 72, 74 of the legs 16 and brace 56 to abut the bottom face 32 of the beam 12 thereby being in load transmitting engagement. This engagement of the beam 12 with the brace 56 and second legs 16 adds considerably to the load capacity of the sawhorse 10.

The limit means 20 may be of any suitable type which acts to prevent more than desired spreading of pivotal movement between the first and second legs of 14, 16. Conveniently, the limit means 20 comprises a length of rope 76 which is knotted at each end to constrain the first and second legs 14, 16. It will be appreciated that the maximum spreading allowed by the rope 76 is such that will place the ends 72, 74 of the legs 16 and brace 56 in load supporting engagement with the adjacent bottom face 32.

Although not necessary for strictly load supporting functions, it is often desirable to prevent collapsing rotating movement of the legs 14, 16, as when temporarily shifting the sawhorse 10 from one location to another. To this end, the rotation preventing means 22 comprises a member 78 which is pivotally connected by a fastener 80 to one of the members 52 and provides a notched shoulder 82 at the opposite end thereof for engaging the brace 42 as shown best in FIG. 1.

Figure 6:
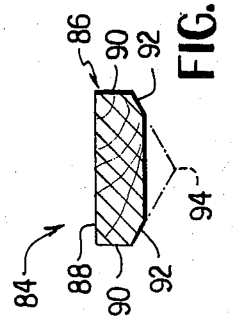
FIG. 6 is a cross-sectional view, similar to FIG. 4, of another embodiment of this invention.

Referring to FIG. 6, another embodiment 84 of this invention is partially illustrated. In the sawhorse 84 the beam 86 is of generally pentagonal cross-section having an upper planar surface 88 corresponding to the base of the pentagon, a pair of generally vertical parallel sides 90 intersecting the surface 88 and a pair of downwardly extending converging bottom faces 92. Imaginary extensions of the bottom faces 92 meet along an imaginary line 94 corresponding to the apex of the pentagon.

Although the sawhorse 10 of this invention is illustrated as made of wood, which is the preferred material, another equally satisfactory material is aluminum. Other conceivable materials include organic polymeric resins such as polyethylene, polypropylene and the like.

To illustrate the space savings afforded by the sawhorse 10, a conventionally-size sawhorse 36 inches in length is about 21 inches wide at the base and is 28 inches high. Accordingly, if the sawhorse 10 were rigidly constructed, it would occupy a rectilinear volume of 21,168 cubic inches. The same sawhorse, in accordance with the principles of this invention, folds into the configuration of FIG. 2 and is 36 inches by 30 inches by 4¼ inches to occupy a volume of 4586 cubic inches, about one fifth of the storage volume required of the conventional sawhorse.

The sawhorse 10 of this invention is surprisingly study. A 175 pound indivisual standing on the beam 12, bouncing or jumping up and down, has no feeling or insecurity. As a partial test, the front end of a Pinto sedan was supported on two sawhorses 10 to allow an individual to work under the car. It accordingly appears that the sawhorse 10 has surprisingly large load bearing capabilities.

Although the invention has been described in its preferred forms with a certain degree of particularity, it is understood that the present disclosure of the preferred forms is only by way of example and that numerous changes in details of construction and the combination and arrangement of parts may be resorted to without departing from the spirit and scope of the invention as hereinafter claimed.

I claim:

1. A collapsible sawhorse moving between storage and load supporting positions, comprising an elongate beam of generally pentagonal cross-section having a length dimension, a width dimension and a thickness dimension, the beam having a planar upper surface corresponding to the base of the pentagon, a pair of generally parallel sides intersecting the upper surface and corresponding to the sides of the pentagon and first and second downwardly extending converging bottom faces intersecting the parallel sides;

a first pair of generally straight parallel spaced legs having a long dimension and an end generally perpendicular to the long dimension, the end abutting the first bottom face of the base;

means rigidly connecting the end and the first bottom face;

a second pair of generally straight parallel spaced legs having a long dimension and an end generally perpendicular to the long dimension, the second legs being of generally the same size as the first legs;

a pair of hinges connecting the first and second legs including a first arm connected to the first leg, a second arm connected to the second leg and a pivot connection located adjacent the convergence of the base bottom faces; the arrangement between the hinges and the second legs being such as to abut the ends of the second legs against the second bottom face in load supporting position of the sawhorse;

means for limiting pivotal movement of the second legs relative to the first legs in a spreading direction; and means for selectively preventing pivotal movement of the legs toward each other.

2. The sawhorse of claim 1 wherein an extension of the convergence of the bottom faces intersects the pivot connection.

3. The sawhorse of claim 1 further comprising a first brace connecting the first legs together, the first brace comprising a side abutting the first bottom face of the base and means connecting the first brace and the first leg.

4. Th sawhorse of claim 3 further comprising means connecting the first brace and the beam.

5. The sawhorse of claim 4 further comprising a second brace connecting the second legs together, the second brace comprising a side abutting the second bottom face in the lead supporting position.

6. Th sawhorse of claim 5 wherein the limiting means prevents spreading pivotal movement of the first and second legs beyond the position where the second leg ends abut the second bottom face of the base.

7. The sawhorse of claim 1 wherein the thickness dimension is substantially less than the width dimension.

8. The sawhorse of claim 1 wherein the beam comprises a section of pentagonal cross-section where the bottom faces converge at a location corresponding to the apex of the pentagon.

9. The sawhorse of claim 1 wherein the beam is of uniform generally pentagonal cross-section and the bottom faces terminate short of convergence.

* * * * *